United States Patent
Kadota et al.

(10) Patent No.: US 9,718,053 B2
(45) Date of Patent: Aug. 1, 2017

(54) POROUS HONEYCOMB STRUCTURE AND PRODUCING THE SAME

(71) Applicant: DENSO CORPORATION, Kariya, Aichi-pref. (JP)

(72) Inventors: Yoichi Kadota, Kariya (JP); Tomohiko Nakanishi, Kariya (JP); Kensuke Takizawa, Chiryu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/820,719

(22) Filed: Aug. 7, 2015

(65) Prior Publication Data
US 2016/0038927 A1 Feb. 11, 2016

(30) Foreign Application Priority Data
Aug. 8, 2014 (JP) ................... 2014-162523

(51) Int. Cl.
 *B01J 35/04* (2006.01)
 *B01J 23/63* (2006.01)
 (Continued)

(52) U.S. Cl.
 CPC .............. *B01J 35/04* (2013.01); *B01J 23/10* (2013.01); *B01J 23/63* (2013.01); *B01J 35/002* (2013.01); *B01J 35/023* (2013.01); *B01J 37/0018* (2013.01); *B01J 37/0045* (2013.01); *C04B 38/0006* (2013.01); *B01D 53/9445* (2013.01); *B01D 2255/102* (2013.01); *B01D 2255/2065* (2013.01); *B01D 2255/2092* (2013.01); *B01D 2255/20707* (2013.01); *B01D 2255/20715* (2013.01); *B01D 2255/50* (2013.01); *B01J 35/0006* (2013.01); *Y02T 10/22* (2013.01)

(58) Field of Classification Search
 CPC ...... B01J 35/04; B01J 37/0018; B01J 35/002; B01J 35/023; B01J 35/0006; B01J 37/0045; B01J 23/63; B01J 23/10; C04B 38/0006; Y02T 10/22; B01D 2255/2065; B01D 2255/20707; B01D 53/9445; B01D 2255/2092; B01D 2255/20715; B01D 2255/102; B01D 2255/50; F01N 2330/30
 See application file for complete search history.

(56) References Cited

U.S. PATENT DOCUMENTS 7,811,650 B2 * 10/2010 Ohno ................. B01D 46/247
 156/89.22
2005/0227869 A1 10/2005 Ohno et al.
 (Continued)

FOREIGN PATENT DOCUMENTS

JP 2005-218935 8/2005
JP 2006-104028 4/2006
 (Continued)

*Primary Examiner* — Anthony J Zimmer
(74) *Attorney, Agent, or Firm* — Nixon & Vanderhye P.C.

(57) ABSTRACT

A porous honeycomb structure including multiple co-catalyst particles and multiple inorganic binder particles of smaller particle diameter than the co-catalyst particles. Each co-catalyst particle is comprised of a ceria-zirconia solid solution. The inorganic binder particles reside between the co-catalyst particles. In the honeycomb structure, an exposure fraction of the co-catalyst particles from the inorganic binder particles on a cross-section of the honeycomb structure is within a range of 3 to 10%.

5 Claims, 8 Drawing Sheets

(51) Int. Cl.
*B01J 23/10* (2006.01)
*B01J 35/00* (2006.01)
*B01J 37/02* (2006.01)
*C04B 38/00* (2006.01)
*B01D 53/94* (2006.01)
*B01J 35/02* (2006.01)
*B01J 37/00* (2006.01)

(56) References Cited

U.S. PATENT DOCUMENTS

| | | | | |
|---|---|---|---|---|
| 2006/0216466 A1* | 9/2006 | Yoshida | ............. | B01D 39/2093 |
| | | | | 428/116 |
| 2010/0221160 A1* | 9/2010 | Adib | ................. | B01D 53/9418 |
| | | | | 423/213.2 |
| 2012/0122660 A1* | 5/2012 | Andersen | ................ | B01J 23/30 |
| | | | | 502/65 |

FOREIGN PATENT DOCUMENTS

| | | |
|---|---|---|
| JP | 2012-106909 | 6/2012 |
| JP | 2012-519067 | 8/2012 |
| WO | WO 2010/099275 | 9/2010 |

\* cited by examiner

POROUS HONEYCOMB STRUCTURE AND PRODUCING THE SAME

CROSS-REFERENCE TO RELATED APPLICATION

This application is based on and claims the benefit of priority from earlier Japanese Patent Applications No. 2014-162523 filed Aug. 8, 2014, the descriptions of which are incorporated herein by reference.

BACKGROUND

Technical Field

The present invention relates to a porous honeycomb structure comprised of co-catalyst particles and inorganic binder particles, and producing the same.

Related Art

A honeycomb structure made of cordierite or SiC or the like is used to purify a vehicle exhaust gas. More specifically, an exhaust gas purification catalyst having a co-catalyst, which is made of a ceria-zirconia solid solution or the like, and a noble metal catalyst both supported by an inorganic binder is used as the honeycomb structure.

In recent years, attempts have been made to construct a honeycomb structure using a co-catalyst component or the like. More specifically, as proposed in WO2010099275, a mixture of an inorganic binder and an oxide-based component including a ceria-zirconia solid solution and a zeolite is formed and fired to a honeycomb structure.

However, there is a problem with the above conventional honeycomb structure that high strength and high exhaust gas purification performance cannot both be achieved. Particularly, the strength is prone to be insufficient since the above conventional honeycomb structure has relatively many sites where co-catalyst particles are weakly bound. Indeed, an increased amount of inorganic binder can lead to increased strength of the above conventional honeycomb structure, however, which may reduce the specific surface area and degrade the exhaust gas purification performance.

In consideration of the foregoing, exemplary embodiments of the present invention are directed to providing a honeycomb structure having both higher strength and higher exhaust gas purification performance, and a method of producing such a honeycomb structure.

SUMMARY

In accordance with an exemplary embodiment of the present invention, there is provided a porous honeycomb structure including: multiple co-catalyst particles, each co-catalyst particle including a ceria-zirconia solid solution; multiple inorganic binder particles of smaller particle diameter than the co-catalyst particles, the inorganic binder particles residing between the co-catalyst particles. In the honeycomb structure, an exposure fraction of the co-catalyst particles from the inorganic binder particles on a cross-section of the honeycomb structure is within a range of 3 to 10%.

In accordance with another exemplary embodiment of the present invention, there is provided a method of producing the porous honeycomb structure of the above embodiment. The method includes: a first mixing step of mixing the co-catalyst particles and a first sol including the inorganic binder particles to produce a mixture slurry; a drying step of spray drying the mixture slurry to obtain composite particles including the co-catalyst particles and the inorganic binder particles coating the co-catalyst particles; a second mixing step of mixing the composite particles and a second sol including the inorganic binder particles to obtain kneaded clay; a forming step of forming the kneaded clay into a honeycomb shape to obtain a shaped body; and a firing step of firing the shaped body to obtain the honeycomb structure. In the method, a loading of the inorganic binder particles is within a range of 0.2 to 6 parts by weight per 100 parts by weight of the co-catalyst particles in the first mixing step, and a total loading of the inorganic binder particles in the first and second mixing steps is within a range of 7 to 18 parts by weight per 100 parts by weight of the co-catalyst particles.

The honeycomb structure of the above embodiment includes the co-catalyst particles and the inorganic binder particles present between the co-catalyst particles. The exposure fraction of the co-catalyst particles from the inorganic binder particles on a cross-section of the honeycomb structure is adjusted within the specific range (of 3 to 10%). With this configuration, there are few co-catalyst particles binding to each other with low binding strength in the honeycomb structure, and reduction of the specific surface area can be prevented. Therefore, the honeycomb structure of the above embodiment can exhibit high strength while preventing degradation of exhaust gas purification performance. That is, both high strength and high exhaust gas purification performance can be achieved.

The honeycomb structure of the above embodiment includes the co-catalyst particles comprised of the ceria-zirconia solid solution. With this configuration, there is no need to support the co-catalyst particles on the honeycomb structure, and the honeycomb structure itself can exhibit the co-catalyst nature with the noble metal catalyst.

The honeycomb structure of the above embodiment is produced by performing the first mixing step, the drying step, the second mixing step, the forming step, and the firing step. Particularly, performing the first mixing step and the drying step allows the composite particles formed of the co-catalyst particles and the inorganic binder particles coating the co-catalyst particles to be produced. Using the co-catalyst particles to perform the second mixing step, the forming step, and the firing step enables production of the honeycomb structure with the exposure fraction within the specific range of 3 to 10%. The honeycomb structure produced in such a manner can exhibit both high strength and high exhaust gas purification performance.

DESCRIPTION OF SPECIFIC EMBODIMENTS

Figure 1:
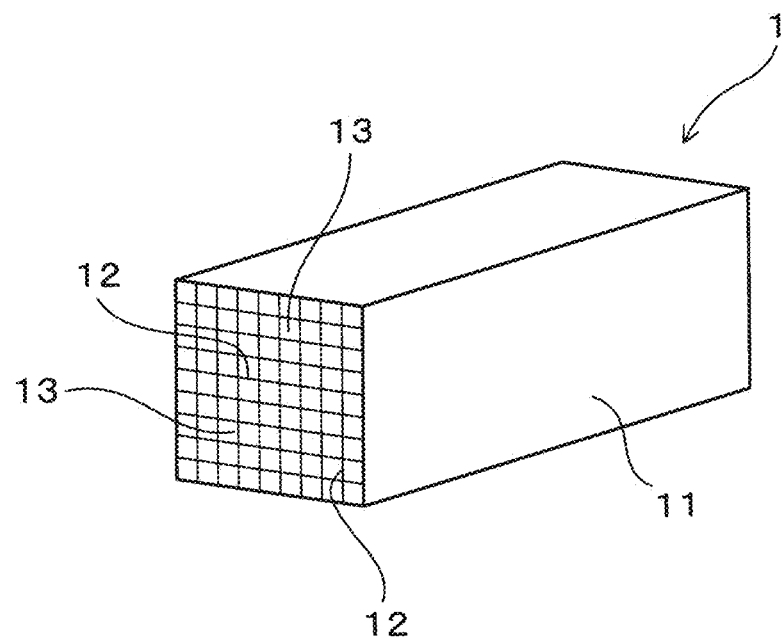
FIG. 1 is a perspective view of a honeycomb structure in a first example.

Hereinafter, an embodiment of the invention will be described with reference to the accompanying drawings. A honeycomb structure of the present embodiment has a three-way catalyst supported thereon, where the three-way catalyst contains at least one kind of noble metal selected from a group of Pt, Rh, Pd, and the like. With such a three-way catalyst supported on the honeycomb structure, the honeycomb structure containing co-catalyst particles can improve the catalyst performance of the three-way catalyst. Each co-catalyst particle is comprised of a ceria-zirconia solid solution of zirconium in ceria. In this specification, the ceria-zirconia solid solution may be a solution of zirconium and another rare earth element, such as La, Y or the like, in ceria. Each inorganic binder particle is comprised of at least one kind of compound selected from a group of alumina, silica, zirconia, titania, and the like.

An exposure fraction of the co-catalyst particles from the inorganic binder particles may be defined as a percentage of a total surface area of the co-catalyst particles exposed from the inorganic binder particles without being coated with the inorganic binder particles relative to a cross-sectional area of the honeycomb structure. Generally, in the honeycomb structure comprised of the co-catalyst particles, the co-catalyst particles are less prone to be sintered and binding to each other with low binding strength where the co-catalyst particles are in direct contact with each other (that is, in contact with each other with no inorganic binder particles between the co-catalyst particles), which leads to low strength. Therefore, a lower exposure fraction of the co-catalyst particles from the inorganic binder particles will lead to higher strength of the honeycomb structure. A method of measuring the exposure fraction will be described later in more detail.

Preferably, a porosity of the honeycomb structure may be within a range of 40 to 60% by volume. Adjusting the porosity within this range can provide the honeycomb structure with sufficiently high strength, a lower heat capacity, and higher purification performance during warm-up. The porosity of the honeycomb structure can be controlled by adjusting average particle diameters of materials, proportions of the materials, and firing conditions or the like in producing of the honeycomb structure. The porosity of the honeycomb structure may be measured using the mercury intrusion technique.

The honeycomb structure may include a cylindrical outer skin, porous walls arranged inside the outer skin as defining a grid, and a plurality of cells partitioned by the walls and extending in an axial direction of the honeycomb structure. Each cell may be polygonal, for example, triangular, quadrilateral, hexagonal, or octagonal in cross-sectional shape. The honeycomb structure may be column-shaped, for example, circular-column-shaped or polygonal-column-shaped in overall shape. Accordingly, the outer skin may be cylindrical, for example, circularly or polygonally cylindrical in overall shape.

A method of producing the honeycomb structure includes at least a first mixing step, a drying step, a second mixing step, a forming step, and a firing step. A first sol in the first mixing step includes sol substances including inorganic binder particles, such as an alumina sol, a silica sol, a zirconia sol, a titania sol or the like. In the drying step, a mixture slurry acquired via the first mixing step is spray dried. The spray drying of the mixture slurry may be performed by jetting the mixture slurry into hot air. Such spray drying allows co-catalyst particles to be coated with inorganic binder particles, providing composite particles. One composite particle may include one co-catalyst particle and a plurality of co-catalyst particles coating the one co-catalyst particle, or may include a plurality of co-catalyst particles and a plurality of inorganic binder particles present between the co-catalyst particles and coating surfaces of the co-catalyst particles.

In the second mixing step, the second sol including the inorganic binder particles and the composite particles are mixed. The loading (A) of the inorganic binder particles in the second mixing step may be determined by subtracting the loading (C) of the inorganic binder particles in the first mixing step from the total loading (B) of the inorganic binder particles used to produce the honeycomb structure (i.e., A=B−C). In the second mixing step, organic binders and/or forming aids or the like may be further added as needed to facilitate the subsequent forming step.

The loading of the inorganic binder particles in the first mixing step is within a range of 0.2 to 6 parts solids by weight per 100 parts by weight of the co-catalyst particles. The total loading of the inorganic binder particles in the first and second steps is within a range of 7 to 18 parts solids by weight per 100 parts by weight of the co-catalyst particles.

A ratio of inorganic binder particle diameter to co-catalyst particle diameter is preferably equal to or less than 1/100, more preferably, equal to or less than 1/500. This can not only facilitate production of the composite particles, but also increase the occurrence of contact between the co-catalyst particles and the inorganic binder particles and the occurrence of contact between the inorganic binder particles, which can improve the strength of the honeycomb structure. The ratio of inorganic binder particle diameter to co-catalyst particle diameter is the average particle diameter $D2$ of the inorganic binder particles divided by the average particle diameter $D1$ of the co-catalyst particles (i.e., $D2/D1$). The average particle diameter of the co-catalyst particles and the average particle diameter of the inorganic binder particles are particle diameters at integrated volume values of 50% in the respective particle diameter distributions determined by the laser-diffraction scattering method.

In the forming step, kneaded clay obtained after the second mixing step is formed into a honeycomb shape. Subsequently, in the firing step, the shaped body obtained after the forming step is fired. The firing of the shaped body may be performed at a temperature of 700 to 1200 degrees Celsius for 2 to 50 hours.

EXAMPLES

First Example

A honeycomb structure in accordance with a first example of the present invention will now be explained. The honeycomb structure 1 of the present example, as shown in FIG. 1, is quadrilateral-column-shaped (35 mm×35 mm×130 mm). The honeycomb structure 1 includes a square cylindrical outer skin 11, cell walls 12 arranged inside the outer skin 11 as defining a square grid, and multiple cells 13 partitioned by the cell walls. The quadrilateral-column-shaped honeycomb structure 1 may be produced as follows. First, a plurality of honeycomb structures 1 having noble metal particles (as catalysts) supported thereon are produced. Subsequently, an assembly of the honeycomb structures 1 (not shown) is produced by joining together the outer skins 11 of the respective honeycomb structures 1. A circular-column-shaped assembly of the honeycomb structures 1 is cut out from the quadrilateral-column-shaped assembly. The circular-column-shaped assembly of the honeycomb structures 1 may be disposed in an exhaust gas flow path. Alternatively, the quadrilateral-column-shaped honeycomb structure 1 itself may be disposed in the exhaust gas flow path.

Figure 2:
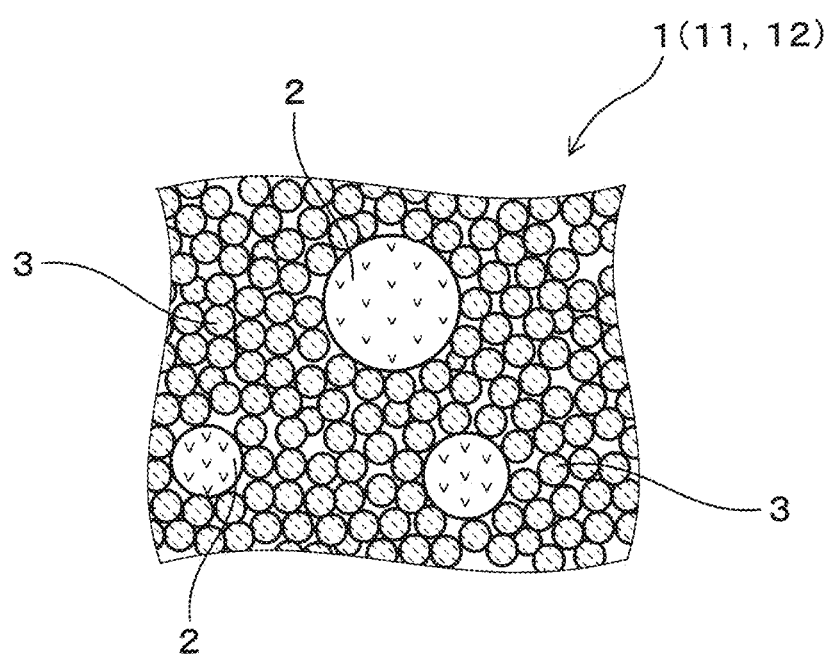
FIG. 2 is a partially enlarged cross-sectional view of the honeycomb structure (for samples X1-X3) in the first example.

The honeycomb structure 1, more specifically, the outer skin 11 and the cell walls 12, as shown in FIG. 2, include multiple co-catalyst particles 2 and multiple inorganic binder particles 3 between the co-catalyst particles 2. Each of the inorganic binder particles 3 is bound to one or more of the other inorganic binder particles 3 and/or one or more of the co-catalyst particles 2 by fusion to serve as a binder. Each of the co-catalyst particles 2 is comprised of a ceria-zirconia solid solution, and each of the inorganic binder particles 3 is comprised of alumina. There are microscopic gaps between the particles 2, 3, so that the honeycomb structure 1 is porous.

In the honeycomb structure 1, as shown in FIG. 2, the co-catalyst particles 2 and the inorganic binder particles 3 are sintered where each of the co-catalyst particles 2 is coated by multiple inorganic binder particles 3 and the co-catalyst particles 2 are spaced apart from each other by multiple inorganic binder particles 3. That is, in the honeycomb structure 1, most of the co-catalyst particles 2 are in indirect contact with each other through the inorganic binder particles 3. Thus, a fraction of the co-catalyst particles 2 exposed from the inorganic binder particles 3 (referred to as an exposure fraction) is relatively low on a cross-section of the honeycomb structure 1. The exposure fraction of the co-catalyst particles 2 is adjusted equal to or greater than a predetermined value.

In the present example, six honeycomb structure samples X1-X6 that are different in exposure fraction from each other are produced, and characteristics of these samples are evaluated. Each of the six honeycomb structures has a solids content of 10 parts by weight of the inorganic binder particles per 100 parts by weight of the co-catalyst particles.

As a representative example, a method of producing the honeycomb structure sample X1 will now be explained. The honeycomb structure sample X1 is produced by performing a mixing step, a drying step, a second mixing step, a forming step, and a firing step in this order.

More specifically, in the first mixing step, the co-catalyst particles (having an average particle diameter of 20 μm) comprised of the ceria-zirconia solid solution and a first sol including the inorganic binder particles (having an average particle diameter (primary particle diameter) of 20 nm) were mixed. The mixture of the co-catalyst particles and the first sol was further mixed with water so as to have a solids content of 30% by weight (wt %), thereby producing a mixture slurry. The average particle diameter of the co-catalyst particles and the average particle diameter of the inorganic binder particles are particle diameters at integrated volume values of 50% in the respective particle diameter distributions determined by the laser-diffraction scattering method. The co-catalyst particles are granulated from particles having smaller particle diameters. The first sol was an alumina sol (AS-520 available from Nissan chemical industries, Ltd.). A loading of the inorganic binder particles in the first mixing step was set to 0.25 parts solids by weight of the inorganic binder particles per 100 parts by weight of the co-catalyst particles. The ceria-zirconia solid solution of the present example is a solid solution of zirconium and some rare earth elements, such as La and Y, in ceria.

Figure 3:
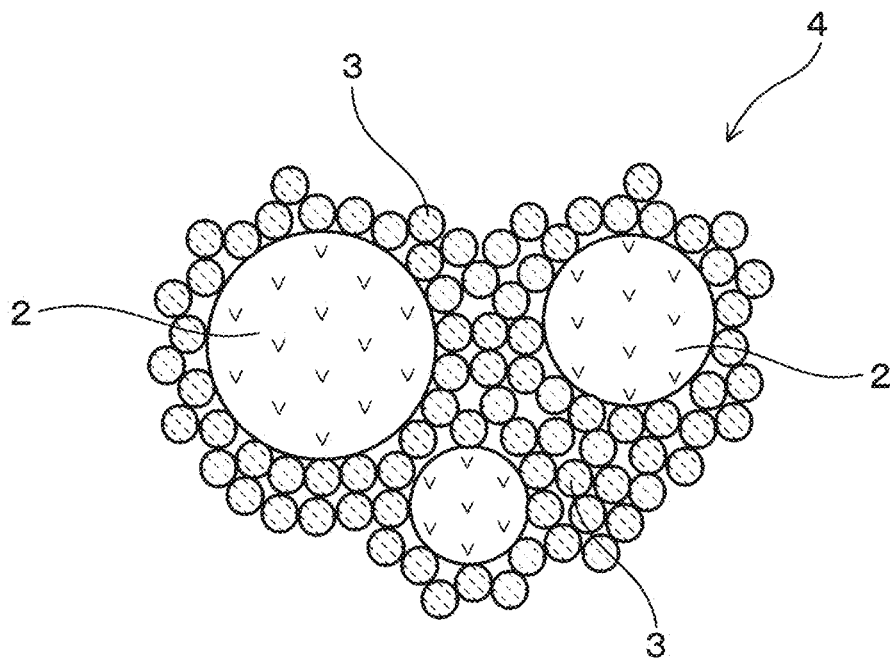
FIG. 3 is a schematic cross-sectional view of a composite particle used in production of the honeycomb structure (for sample X1) in the first example.

Subsequently, in the drying step, the mixture slurry was dried by a spray drying method. In a spraying mode of the spray drying method, a rotary atomizer was utilized with an insert disc having a diameter of 80 mm. A drying condition includes a hot air temperature of 190 degrees Celsius, an exhaust gas temperature of 130 degrees Celsius, and a rotational speed of 24,000 rpm. Thus, composite particles 4 of the co-catalyst particles 2 and the inorganic binder particles 3 coating the co-catalyst particles 2, as shown in FIG. 3, were produced. As shown in FIG. 3, each composite particle 4 is an agglomerate including a plurality of co-catalyst particles 2 and multiple microscopic inorganic binder particles 3 between the co-catalyst particles 2.

Subsequently, in the second mixing step, a second sol including the inorganic binder particles (having an average particle diameter (primary particle diameter) of 20 nm) was mixed with the composite particles 4. Similarly to the first sol, the second sol was an alumina sol (AS-520 available from Nissan chemical industries, Ltd.). A loading of the inorganic binder particles in the second mixing step was set to 9.75 parts solids by weight of the inorganic binder particles per 100 parts by weight of the co-catalyst particles. That is, the total loading of the inorganic binder particles in the first and second mixing steps was set to 10 parts solids by weight of the inorganic binder particles per 100 parts by weight of the co-catalyst particles. Further, organic binders and forming aids and water were added in the mixture of the composite particle 4 and the second sol and then kneaded by a kneader (DS3-10 available from Moriyama Company Ltd.) for 90 minutes so as to produce kneaded clay. The organic binder was methylcellulose (65MP4000 available from Matsumoto Yushi-Seiyaku Co., Ltd.). The forming aid was Unilube 50MB26 available from NOF Corp. A loading of the organic binders was set to 15 parts by weight of the organic binders per 100 parts by weight of the co-catalyst particles, a loading of the forming aids was set to 1 part by weight of the forming aids per 100 parts by weight of the co-catalyst particles, and a loading of the water was set to 33 parts by weight of the water per 100 parts by weight of the co-catalyst particles.

Subsequently, in the forming step, the kneaded clay was formed into a honeycomb shape via extrusion at a forming pressure of 10 MPa so as to produce a honeycomb-shaped body. Thereafter, the honeycomb-shaped body was dried sufficiently using a microwave dryer and a hot air dryer, and then fired at a temperature of 1,000 degrees Celsius for 30 hours in the firing step. Thus, a porous honeycomb structure (sample X1) having a porosity of 50% by volume was produced.

Figure 5:
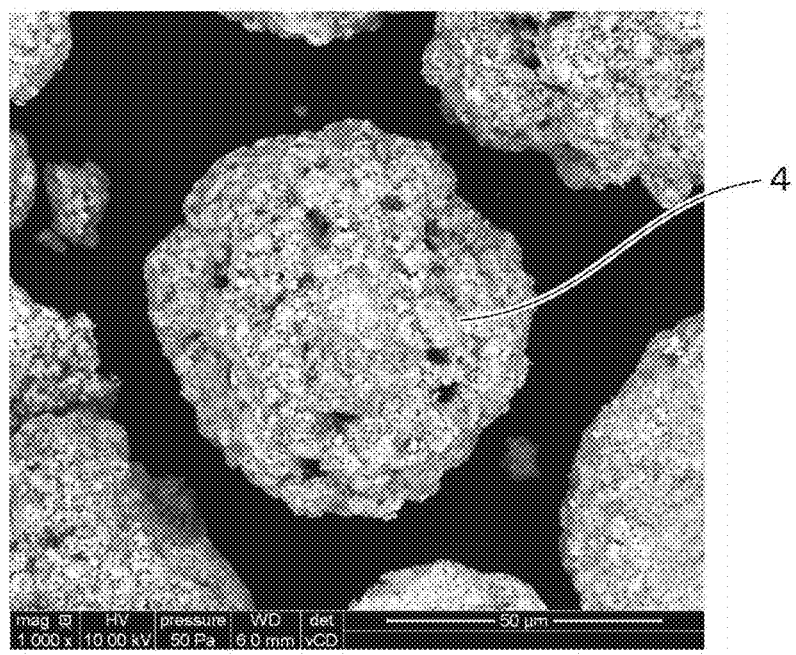
FIG. 5 is a scanning electron micrograph of composite particles used in production of the honeycomb structure (for sample X2) in the first example.

In the present example, four more honeycomb structure samples X2-X5 were produced, where the proportions or loadings of the inorganic binders used in the first and second mixing steps for the samples X2-X5 are altered from those of the sample X1. For the sample X2, a loading of the inorganic binder particles in the first mixing step was set to 1 part solids by weight of the inorganic binder particles per 100 parts by weight of the co-catalyst particles, and a loading of the inorganic binder particles in the second mixing step was set to 9 parts solids by weight of the inorganic binder particles per 100 parts by weight of the co-catalyst particles. For the sample X3, a loading of the inorganic binder particles in the first mixing step was set to 2 parts solids by weight of the inorganic binder particles per 100 parts by weight of the co-catalyst particles, and a loading of the inorganic binder particles in the second mixing step was set to 8 parts solids by weight of the inorganic binder particles per 100 parts by weight of the co-catalyst particles. For the sample X4, a loading of the inorganic binder particles in the first mixing step was set to 10 parts solids by weight of the inorganic binder particles per 100 parts by weight of the co-catalyst particles, and a loading of the inorganic binder particles in the second mixing step was set to 0 part by weight of the inorganic binder particles per 100 parts by weight of the co-catalyst particles. For the sample X5, a loading of the inorganic binder particles in the first mixing step was set to 0.1 parts solids by weight of the inorganic binder particles per 100 parts by weight of the co-catalyst particles, and a loading of the inorganic binder particles in the second mixing step was set to 9.9 parts solids by weight of the inorganic binder particles per 100 parts by weight of the co-catalyst particles. In this way, the honeycomb structure samples X2-X5 were produced. FIG. 5 is a scanning electron micrograph of the composite particles that were used in the production of the sample X2 as a representative example, at 1000× magnification, where FEI Quanta FEG250 was used as a scanning electron microscope (SEM).

Further, in the present example, one more honeycomb structure sample X6 was produced without performing the spray drying. More specifically, the co-catalyst particles and a sol including the inorganic binder particles were mixed. The mixture of the sol and the co-catalyst particles was further mixed with organic binders, forming aids and water and then kneaded by the kneader for 90 minutes, thereby producing kneaded clay. The co-catalyst particles, the sol including the inorganic binder particles, and the forming aids, used in the sample X6, were the same as those of the sample X1. The proportion of the inorganic binder particles was set to 10 parts solids by weight of the inorganic binder particles per 100 parts by weight of the co-catalyst particles. The proportions of the organic binders, the forming aids, and the water are the same as those of the sample X1.

Figure 4:
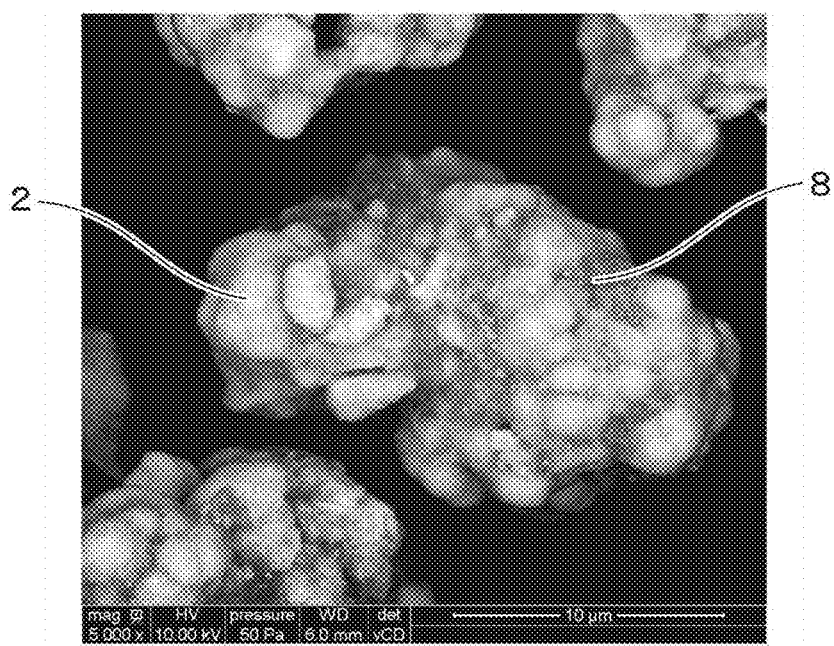
FIG. 4 is a scanning electron micrograph of composite particles used in production of the honeycomb structure (for sample X6) in the first example.
Figure 6:
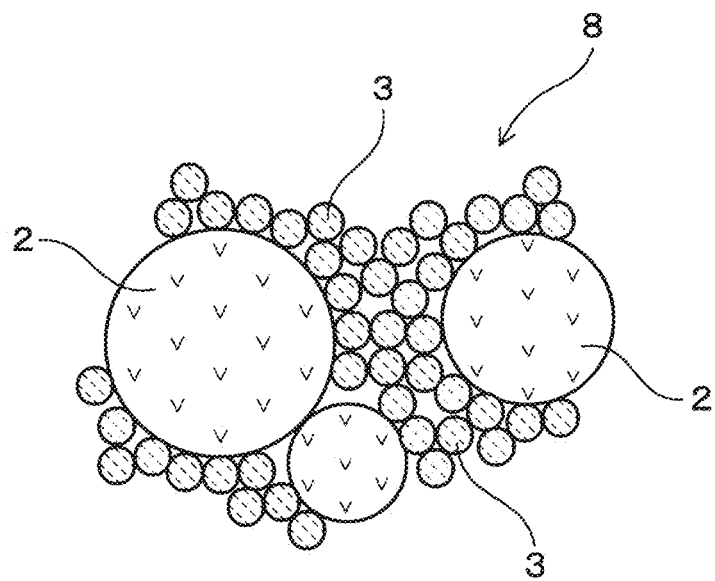
FIG. 6 is a schematic cross-sectional view of a composite particle used in production of the honeycomb structure (for sample X6) in the first example.

Subsequently, the kneaded clay was formed into a honeycomb shape via extrusion at a forming pressure of 10 MPa so as to produce a honeycomb-shaped body. Thereafter, the honeycomb-shaped body was dried sufficiently using the microwave dryer and the hot air dryer, and then fired at a temperature of 1,000 degrees Celsius for 30 hours. The honeycomb structure sample X6 was thereby produced. To examine a condition of the mixture of the sol and the co-catalyst particles that were used in the production of the sample X6, composite particles obtained by drying the mixture were observed by the SEM. FIG. 4 shows a scanning electron micrograph of the composite particles. FIG. 6 schematically shows a cross-section structure of the composite particle obtained by drying the mixture.

Figure 7:
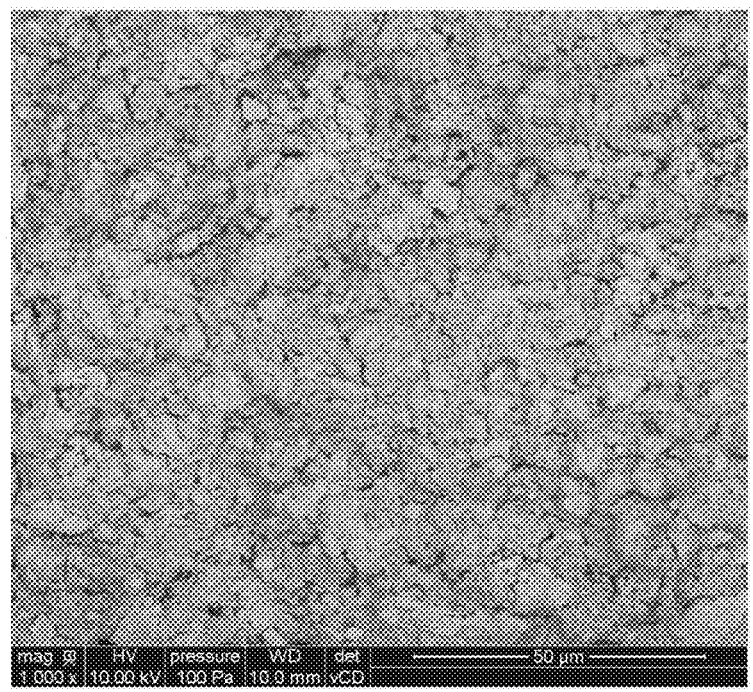
FIG. 7 is a back-scattered scanning electron micrograph of a cross-section of the honeycomb structure (for sample X2) in the first example.
Figure 8:
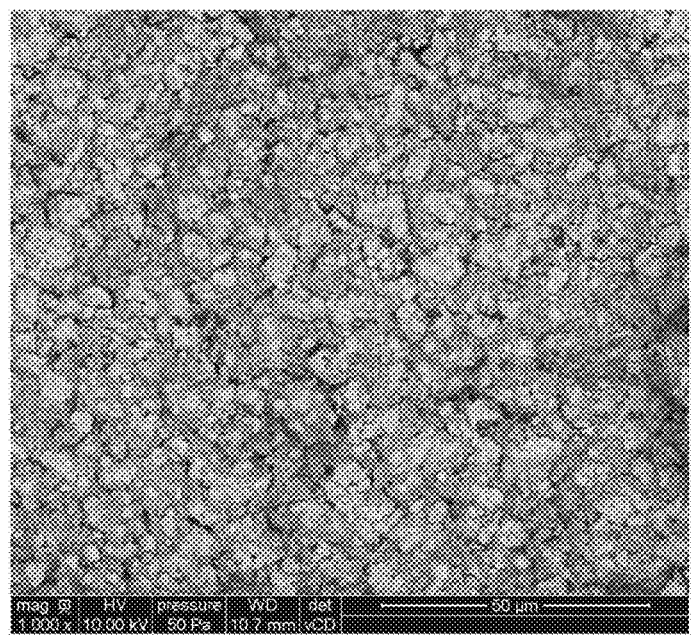
FIG. 8 is a back-scattered scanning electron micrograph of a cross-section of the honeycomb structure (for sample X6) in the first example.

An exposure fraction of the co-catalyst particles from the inorganic binder particles on the cross-section of each of the honeycomb structure samples X1-X6 was measured as follows. More specifically, for each of the honeycomb structure samples X1-X6, a back-scattered scanning electron micrograph was taken of the cross-section in ten visual fields using FEI Quanta FEG250 to acquire image data at 1,000× magnification. In the back-scattered scanning electron micrograph, heavier elements will appear brighter. Therefore, the co-catalyst particles comprised of the ceria-zirconia solid solution and the inorganic binder particles comprised of alumina are distinguishable in the fracture-surface. FIG. 7 shows the image data of the back-scattered scanning electron micrograph of the sample X2 as a representative example. FIG. 8 shows the image data of the back-scattered scanning electron micrograph of the sample X6.

Figure 9:
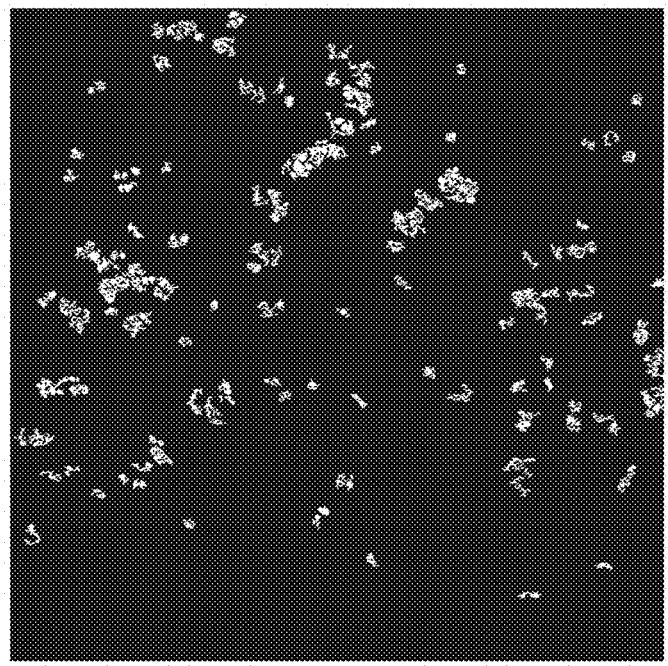
FIG. 9 is image data after binarization processing of FIG. 7.
Figure 10:
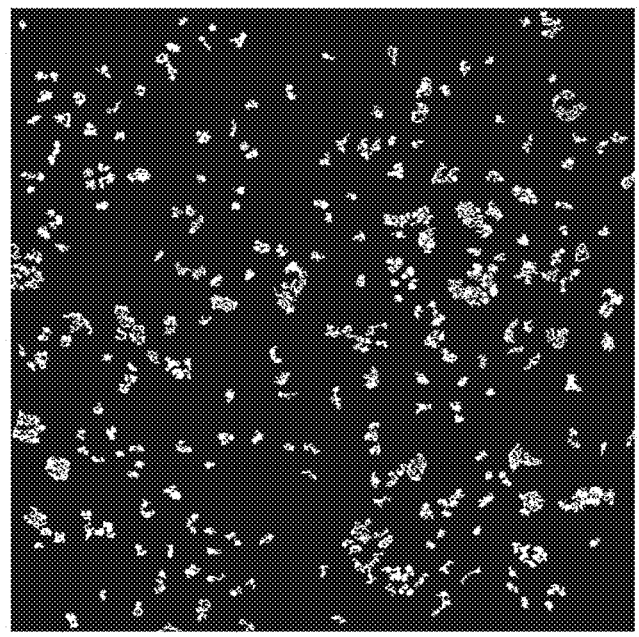
FIG. 10 is image data after binarization processing of FIG. 8.
Figure 11:
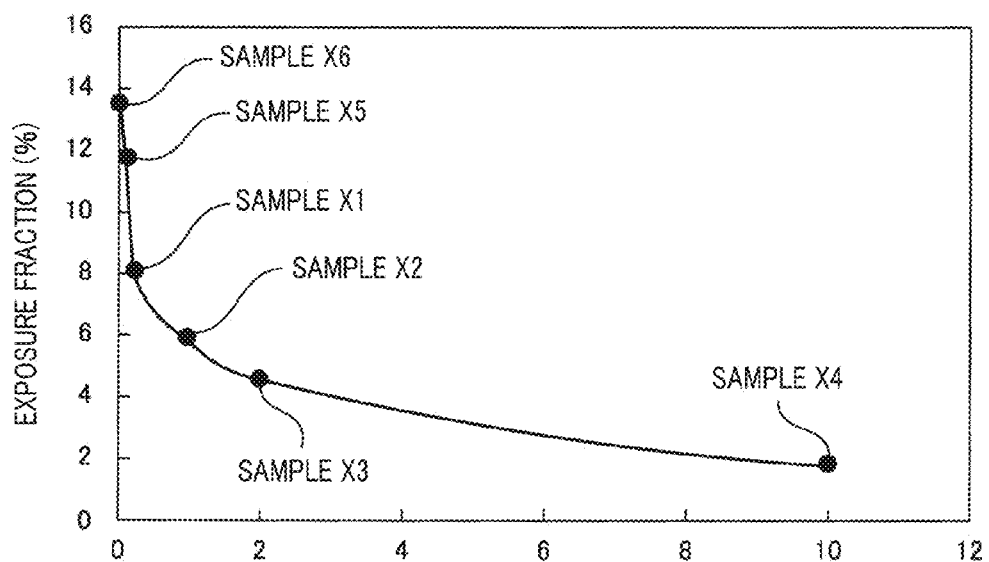
FIG. 11 is a schematic of a relationship between the loading of inorganic binder particles (in parts by weight) in a first mixing step and the exposure fraction in the first example.

Using image analysis software (e.g., ImageJ software), image processing was performed on an arbitrary area of 100 micrometer square in the image data. More specifically, a threshold is set to a median plus a standard deviation for a 256-tone grayscale histogram of the image data with values of 0 and 255 removed. Based on the threshold, extraction of the co-catalyst particles (binarization process) was performed on the image data with the values of 0 and 255 unremoved. Since particle diameters of the co-catalyst particles as measured by the laser-diffraction scattering method were equal to or greater than 1 μm, particles with areas equal to or greater than 0.8 μm$^2$ were extracted. As representative examples, FIG. 9 shows the binarization-processed image data for the sample X2, and FIG. 10 shows the binarization-processed image data for the sample X6. Subsequently, area occupancy ratios of the extracted co-catalyst particles were calculated for the binarization processed image data taken in ten visual fields for each of the samples X1-X6. The arithmetic mean of the area occupancy ratios gives an exposure fraction (in %) for each of the samples X1-X6. The exposure fraction for the sample X1 is 8.1%. The exposure fraction for the sample X2 is 5.9%. The exposure fraction for the sample X3 is 4.5%. The exposure fraction for the sample X4 is 1.8%. The exposure fraction for the sample X5 is 11.8%. The exposure fraction for the sample X6 is 13.5%. FIG. 11 shows a relationship between the loading of the inorganic binder particles (in parts by weight) per 100 parts by weight of the co-catalyst particles in the first mixing step and the exposure fraction (in %) for each of the samples X1-X6.

Figure 12:
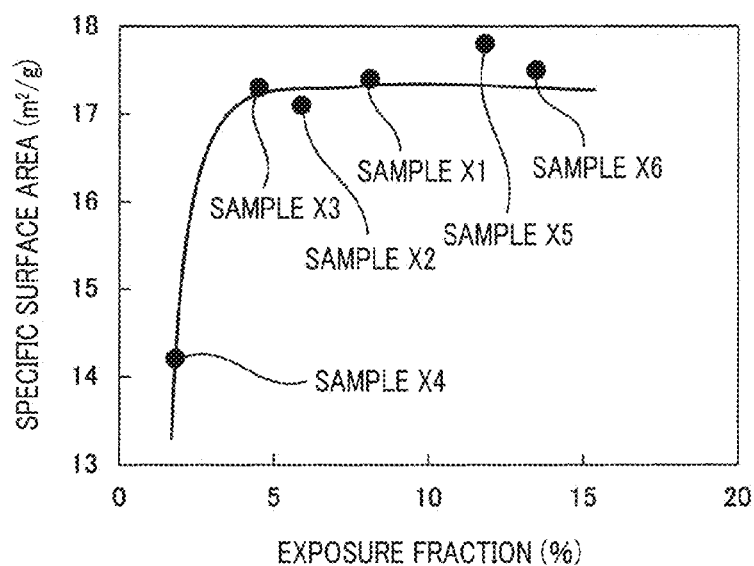
FIG. 12 is a schematic of a relationship between the exposure fraction and the specific surface area in the first example.

Subsequently, a specific surface area of each of the honeycomb structure samples was measured. More specifically, a portion of each honeycomb structure sample was milled to produce milled powder. The specific surface area of 0.1 g milled powder was measured by the Brunauer-Emmett-Teller (BET) method, where the TriStar II 3020 available from Shimadzu Co. Ltd. was used. FIG. 12 shows a relationship between the exposure fraction and the specific surface area for each sample.

Subsequently, the exhaust gas purification performance for each honeycomb structure sample having a catalyst comprising noble metal particles supported on the honeycomb structure was investigated. More specifically, using the core drill, a circular-column-shaped test piece having a diameter of 30 mm and a length of 50 mm was cut out from each honeycomb structure sample. Each test piece was soaked in a diammine dinitroplatinum (II) nitric acid aqueous solution. Thereafter, the test piece was removed from the aqueous solution and the extra solution was blown off of the test piece. The test piece was dried and then heated at a temperature of 600 degrees Celsius for two hours to fire the noble metal particles onto the test piece. A loading of the noble metal particles for each test piece is 0.1 g/L.

Figure 13:
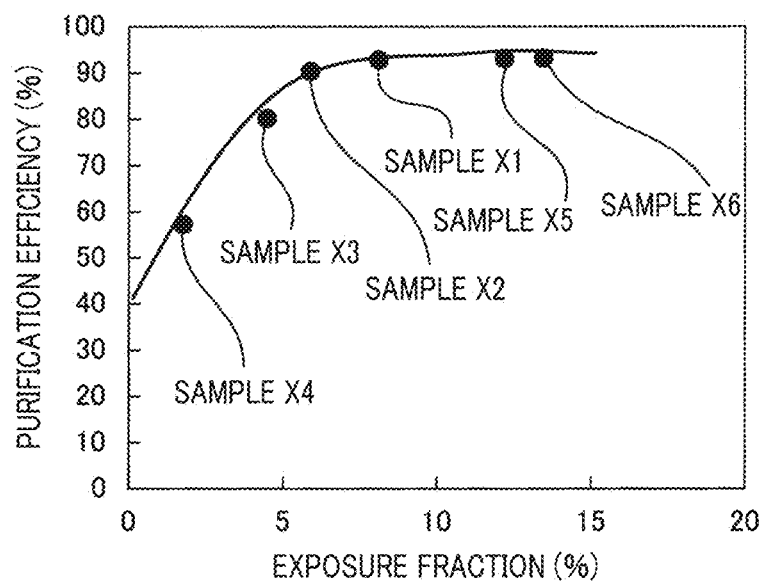
FIG. 13 is a schematic of a relationship between the exposure fraction and the purification efficiency in the first example.

Subsequently, after ceramic fibers were wound around an outer periphery of each test piece, the test piece was mounted within a quartz reactor tube. A gas generated by a gas generator was supplied into the test piece while heating the test piece at a temperature 600 degrees Celsius, where using the gas generator, such as TU-7000 available form HORIBA STEC, Co. Ltd., a lean gas (NO: 1800 ppm, CO2: 14% by volume; H2O: 10% by volume, N2: remnant) and a rich gas (CO: 1700 ppm, CO2: 14% by volume, H2O: 10% by volume, N2: remnant) were alternately supplied into the test piece at intervals of 20 seconds. A gas flow rate was adjusted to 20 L/min. A concentration (C1) of NOx contained in the gas that has passed through the test piece was measured by a gas analyzer (MEXA-1500D available from form HORIBA STEC, Co., Ltd.). A concentration (C0) of NOx contained in the gas that has passed through the quartz reactor tube with no test piece mounted therein was also measured. The purification efficiency (R) was calculated according to the following equation (1). FIG. 13 shows a relationship between the exposure fraction and the purification efficiency for each sample.

$$R\ (\%)=(C0-C1)\times 100/C0 \tag{1}$$

Figure 14:
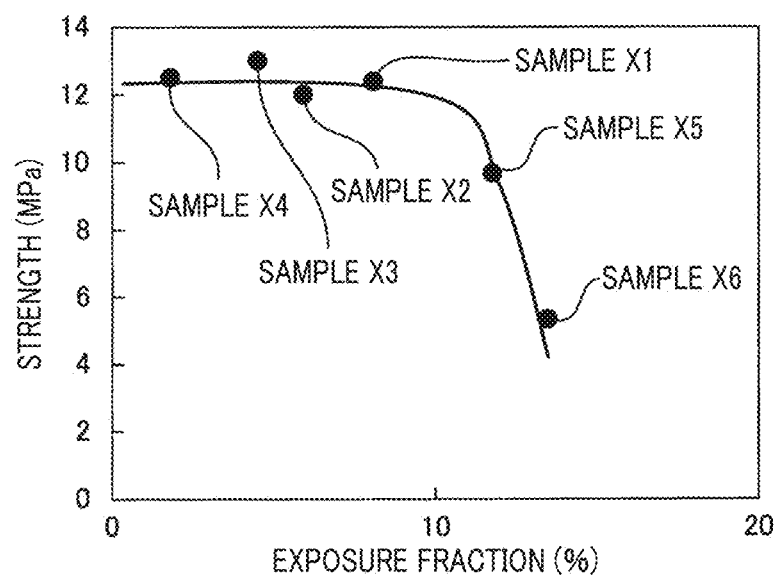
FIG. 14 is a schematic of a relationship between the exposure fraction and the strength in the first example.

In addition, the strength of each honeycomb structure sample was investigated. More specifically, a test piece of 3 cells×3 cells×10 mm (length) was produced from each honeycomb structure sample. Using the autograph (AG-X PLUS available from Shimadzu co. Ltd.), a compressive load was applied to the test piece in its longitudinal direction to measure a breaking load (L). Based on the measurement of the breaking load (L) and the cross-sectional area (S) of a flesh portion of the test piece, the strength (I) was calculated according to the following equation (2). The cross-sectional area (S) of the flesh portion of the test piece is an area calculated by subtracting an area of cell's opening from a cross-sectional area of the sample along a direction perpendicular to the longitudinal direction of the sample. For each sample, five test pieces were produced and the average strength over the five test pieces were calculated. FIG. 14 shows a relationship between the exposure fraction and the strength for each sample.

$$I\ (MPa)=L/S \tag{2}$$

As can be seen from FIGS. 12 and 13, to achieve an increased specific surface area and high purification efficiency, it is preferable that the exposure fraction is equal to or greater than 3%. As can be seen from FIG. 14, to achieve high strength, it is preferable that the exposure fraction is equal to or less than 10%. Therefore, to achieve an increased specific surface area, high purification efficiency, and high strength, it is preferable that the exposure fraction is in a range of 3 to 10%. Actually, the honeycomb structure samples X1-X3 having the exposure fraction in this range can achieve high purification efficiency and high strength. To achieve higher purification efficiency and higher strength, it is preferable that the exposure fraction is equal to or greater than 5%.

Figure 15:
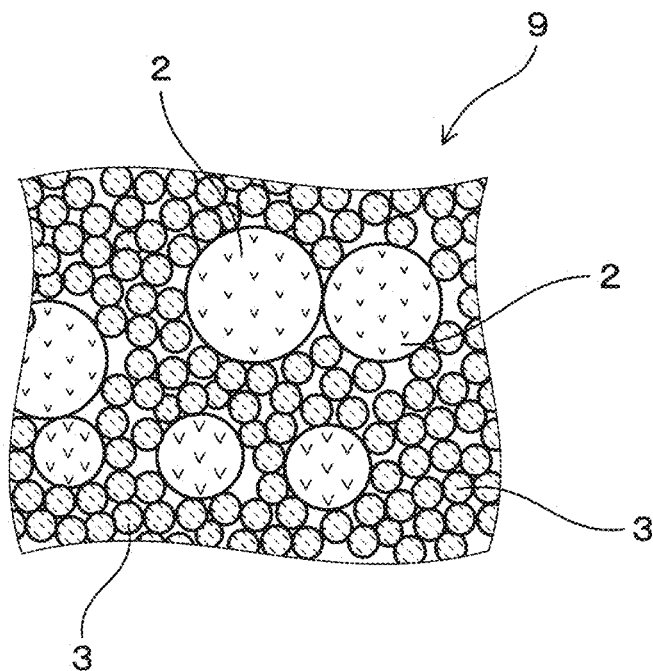
FIG. 15 is a partially enlarged cross-sectional view of the honeycomb structure (for samples X5 and X6) in the first example.

The honeycomb structure 1 having the exposure fraction within the above specific range of 3 to 10% includes, as shown in FIG. 2, the co-catalyst particles 2 and multiple inorganic binder particles 3 between the co-catalyst particles 2, where there are few co-catalyst particles 2 directly binding to each other. Therefore, such a honeycomb structure 1 can achieve high strength. In addition, the co-catalyst particles 2 are exposed from the inorganic binder particles 3 to some extent, which can ensure the purification efficiency at or above a predetermined level. In contrast, in the honeycomb structure 9 having the exposure fraction greater than 10%, such as the sample X5 or X6, there are relatively many co-catalyst particles 2 binding to each other with low binding strength, as shown in FIG. 15. This leads to low strength.

Indeed, as can been observed from FIG. 7 showing a scanning electron micrograph for the sample X2, there are few co-catalyst particles exposed from the inorganic binder particles and binding to each other. In contrast, as can been observed from FIG. 8 showing a scanning electron micrograph for the sample X6, there are relatively many co-catalyst particles exposed from the inorganic binder particles and binding to each other.

The honeycomb structure 1 having the exposure fraction of the co-catalyst particles 2 within the specific range of 3 to 10% can be produced by performing the first mixing step, the drying step, the second mixing step, the forming step, and the firing step as described above. Particularly, the exposure fraction of the co-catalyst particles 2 can be adjusted within the specific range of 3 to 10% by adjusting the proportion or loading of the inorganic binder particles 3 within a range of 0.2 to 6 parts by weight per 100 parts by weight of the co-catalyst particles in the first mixing step and then performing the spray drying (see FIG. 11).

That is, adjusting the proportion of the inorganic binder particles within the specific range of 0.2 to 6 parts by weight per 100 parts by weight of the co-catalyst particles in the first mixing step and then performing the spray drying can provide the composite particles 4 including the inorganic binder particles 3 and the co-catalyst particles 2 coated by the inorganic binder particles 3 as shown in FIGS. 3 and 5. Such composite particles 4 have only a small total surface area of the composite particles 4 exposed from the inorganic binder particles 3. Use of such composite particles 4 can provide the honeycomb structure having the exposure fraction adjusted within the specific range of 3 to 10%. In contrast, in the case that the loading of the inorganic binder particles is set to zero in the first mixing step and then the spray drying is not performed, at least a portion of each composite particle 8 will be exposed from the inorganic binders 3 as shown in FIGS. 4 and 6, which will provide the honeycomb structure with an increased exposure fraction of the co-catalyst particles and insufficient strength, like the honeycomb structure sample X6. Also in the case that the proportion of the inorganic binder particles is set too low in the first mixing step, at least a portion of each composite particle 8 will be exposed from the inorganic binders 3, which will provide the honeycomb structure with an increased exposure fraction of the co-catalyst particles and insufficient strength, like the honeycomb structure sample X5. In addition, in the case that the proportion of the inorganic binder particles is set too high in the first mixing step, the exposure fraction of the co-catalyst particles becomes too low as described above, which may provide the honeycomb structure with significantly degraded purification efficiency, like the honeycomb structure sample X4. Therefore, it is preferable that the loading of the inorganic binder particles is adjusted within the specific range of 0.2 to 6 parts by weight per 100 parts by weight of the co-catalyst particles in the first mixing step and then the mixture slurry produced in the first mixing step is spray dried.

In addition, it is preferable that the loading of the inorganic binder particles in the first mixing step is equal to or less than 1.5 parts by weight per 100 parts by weight of the co-catalyst particles. This allows the exposure fraction of the co-catalyst particles for the resultant honeycomb structure to be equal to or greater than 5%, leading to an increased specific surface area. Thus, the honeycomb structure with higher purification efficiency and higher strength can be provided (see FIGS. 11-14).

As in the present example, it is preferable that the inorganic binder particles 3 are comprised of alumina (see FIG. 2). This allows the resultant honeycomb structure 1 to exhibit higher refractory. Further, manufacturing costs for the honeycomb structure 1 can be reduced.

While not described in detail, the honeycomb structure can contain some other components than the co-catalyst particles and inorganic binder particles to the extent that such other components do not detract from the advantages of the present invention.

Second Example

In the present example, a plurality of honeycomb structures with different proportions of the inorganic binder particles were produced by setting different loadings of the inorganic binder particles in the second mixing step, and the characteristics of the these honeycomb structures ware evaluated. More specifically, for each of the honeycomb structures, the loading of the inorganic binder particles in the first mixing step was set to 1 part by weight per 100 parts by weight of the co-catalyst particles. To produce five honeycomb structure samples X7-X11 with different proportions of the inorganic binder particles, the loadings of the inorganic binder particles in the second mixing step were respectively set to 4, 7, 9, 19, or 29 parts by weight per 100 parts by weight of the co-catalyst particles. That is, the five honeycomb structure samples X7-X11 respectively include 5, 8, 10, 20, and 30 parts by weight of the inorganic binder particles per 100 parts by weight of the co-catalyst particles. The five honeycomb structure samples X7-X11 were produced in a similar manner to produce the honeycomb structure sample X1 in the first example except in that the loadings of the inorganic binder particles in the first and second steps were differently set as above.

Figure 16:
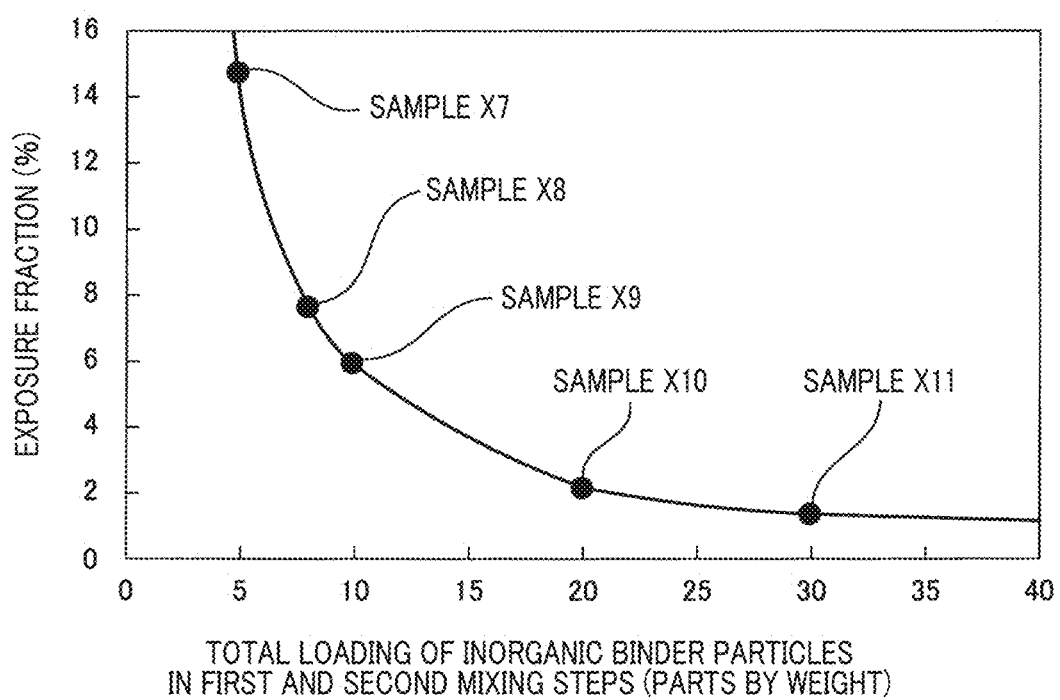
FIG. 16 is a schematic of a relationship between the total loading of inorganic binder particles in first and second steps and the exposure fraction in a second example.

The exposure fractions of the five honeycomb structure samples X7-X11 were measure as in the first example. FIG. 16 shows a relationship between the total loading of the inorganic binder particles in the first and second steps and the exposure fraction for each sample. As can be seen from FIG. 16, the exposure fraction can be adjusted within a range of 3 to 10% by adjusting the total loading (i.e., a proportion) of the inorganic binder particles in the first and second mixing steps within a range of 7 to 18 parts by weight per 100 parts by weight of the co-catalyst particles. Adjusting the exposure fraction of the co-catalyst particles 2 within the range of 3 to 10% can provide the honeycomb structures with high strength and high exhaust gas purification efficiency.

Therefore, preferably, the total loading of the inorganic binder particles in the first and second steps and thus the proportion of the inorganic binder particles contained in the honeycomb structure may be within the range of 7 to 18 parts by weight per 100 parts by weight of the co-catalyst particles, more preferably, within a range of 8 to 12 parts by weight per 100 parts by weight of the co-catalyst particles.

What is claimed is:

1. A porous honeycomb structure comprising:
   multiple co-catalyst particles, each co-catalyst particle including a ceria-zirconia solid solution;
   multiple inorganic binder particles of smaller particle diameter than the co-catalyst particles, the inorganic binder particles residing between the co-catalyst particles,
   wherein an exposure fraction of the co-catalyst particles from the inorganic binder particles on a cross-section of the honeycomb structure is within a range of 3 to 10%, and wherein a proportion of the inorganic binder particles is within a range of 7 to 18 parts by weight per 100 parts by weight of the co-catalyst particles.

2. The honeycomb structure of claim 1, wherein the exposure fraction is within a range of 5-10%.

3. The honeycomb structure of claim 1, wherein the inorganic binder particles comprise alumina.

4. A method of producing the porous honeycomb structure of claim 1, comprising:
   a first mixing step of mixing the co-catalyst particles and a first sol including the inorganic binder particles to produce a mixture slurry;
   a drying step of spray drying the mixture slurry to obtain composite particles including the co-catalyst particles and the inorganic binder particles coating the co-catalyst particles;
   a second mixing step of mixing the composite particles and a second sol including the inorganic binder particles to obtain kneaded clay;
   a forming step of forming the kneaded clay into a honeycomb shape to obtain a shaped body; and
   a firing step of firing the shaped body to obtain the honeycomb structure,
   wherein a loading of the inorganic binder particles is within a range of 0.2 to 6 parts by weight per 100 parts by weight of the co-catalyst particles in the first mixing step, and a total loading of the inorganic binder particles in the first and second mixing steps is within a range of 7 to 18 parts by weight per 100 parts by weight of the co-catalyst particles.

5. The method of claim 4, wherein a loading of the inorganic binder particles in the first mixing step is equal to or less than 1.5 parts by weight per 100 parts by weight of the co-catalyst particles.

* * * * *